US009742144B1

(12) United States Patent
Kang

(10) Patent No.: US 9,742,144 B1
(45) Date of Patent: Aug. 22, 2017

(54) CMOS COMPATIBLE RARE-EARTH-DOPED WAVEGUIDE AMPLIFIER

(71) Applicant: LGS INNOVATIONS LLC INC, Herndon, VA (US)

(72) Inventor: Inuk Kang, Holmdel, NJ (US)

(73) Assignee: LGS INNOVATIONS LLC, Herndon, VA (US)

( * ) Notice: Subject to any disclaimer, the term of this patent is extended or adjusted under 35 U.S.C. 154(b) by 0 days.

(21) Appl. No.: 15/389,567

(22) Filed: Dec. 23, 2016

Related U.S. Application Data

(60) Provisional application No. 62/398,260, filed on Sep. 22, 2016.

(51) Int. Cl.
*H01S 3/067* (2006.01)
*H01S 5/50* (2006.01)
*H01S 3/063* (2006.01)
*H01S 3/16* (2006.01)
*H01S 3/094* (2006.01)

(52) U.S. Cl.
CPC ............ *H01S 3/0637* (2013.01); *H01S 3/094* (2013.01); *H01S 3/1603* (2013.01)

(58) Field of Classification Search
CPC ..................... H01S 3/0637; H01S 5/50; G02B 2006/12085; G02B 2006/121; G02B 2006/12121; G02B 2006/12061
See application file for complete search history.

(56) References Cited

U.S. PATENT DOCUMENTS

| H1848 H | 5/2000 | Amin et al. |
|---|---|---|
| 6,650,818 B2 | 11/2003 | Gao |
| 6,882,782 B2 | 4/2005 | Conzone et al. |
| 7,180,656 B2 | 2/2007 | Patel et al. |
| 2004/0136681 A1* | 7/2004 | Drewery ................. H01S 3/063 385/142 |
| 2005/0122569 A1* | 6/2005 | Shin ........................ H01S 3/091 359/333 |
| 2006/0098928 A1* | 5/2006 | Koch ..................... G02B 6/132 385/129 |

FOREIGN PATENT DOCUMENTS

JP          2002231995 A  *  8/2002

* cited by examiner

*Primary Examiner* — Eric Bolda
(74) *Attorney, Agent, or Firm* — Baker and Hostetler LLP

(57) ABSTRACT

The present application is directed to a planar waveguide amplifier. The planar waveguide amplifier includes a substrate having an upper surface and a lower surface. The planar waveguide amplifier includes a core formed on an upper surface of the substrate. The core includes a channel configured to transmit light there through. The planar waveguide amplifier also includes an upper cladding layer formed above the core. The upper cladding layer includes a glass doped with rare earth material in an amount less than about 5% of the upper cladding layer. The application is also directed to a method of amplifying a signal.

20 Claims, 5 Drawing Sheets

PROVIDING A WAVEGUIDE AMPLIFIER INCLUDING A SUBSTRATE HAVING UPPER AND LOWER SURFACES, A CORE DISPOSED ON THE UPPER SURFACE OF THE SUBSTRATE, AND AN UPPER CLADDING LAYER DISPOSED ON THE CORE AND INCLUDING A RARE-EARTH DOPED MATERIAL

410

RECEIVING A SIGNAL LIGHT IN A FIRST END OF THE CORE

420

RECEIVING A PUMP LIGHT IN THE CORE TO EXCITE A SURFACE OF THE UPPER CLADDING LAYER INCLUDING THE RARE-EARTH DOPED MATERIAL

430

GUIDING THE SIGNAL AND PUMP LIGHT THROUGH THE CORE SUCH THAT ABOUT 30-40% OF A MODE OF THE SIGNAL LIGHT AND A MODE OF THE PUMP LIGHT OVERLAP IN THE UPPER CLADDING LAYER

440

AMPLIFYING THE SIGNAL LIGHT AFTER THE GUIDING STEP

CMOS COMPATIBLE RARE-EARTH-DOPED WAVEGUIDE AMPLIFIER

CROSS-REFERENCE TO RELATED APPLICATIONS

This application claims the benefit of priority of U.S. Provisional Application No. 62/398,260 filed on Sep. 22, 2016, entitled, "CMOS Compatible Rare-Earth-Doped Waveguide Amplifier," the contents of which is incorporated by reference in its entirety herein.

FIELD

The present application is directed to rare earth (RE)-doped waveguide amplifiers, methods of making RE-doped waveguide amplifiers, and methods of amplifying light through RE-doped waveguide amplifiers.

BACKGROUND

Optical waveguides are physical structures that guide electromagnetic waves in the optical spectrum. These waveguides are typically employed as components in photonic integrated circuits (PICs) or as a transmission medium in local and long haul optical communication systems.

Optical waveguides can be categorized according to their geometry of the optical guiding structure as being slab, channel, ridge, rib or fiber waveguides. Most waveguides used in PICs generally include three planar layers of materials. The bottom layer is a substrate or lower cladding. The middle layer is called the core. The top layer is called a cover or upper cladding. Each layer may have a different dielectric constant. For commercial applications where optical components need to be relatively small and device integration is desirable, photonic-integrated waveguide optical amplifiers are desired.

Generally, there are two classes of waveguide optical amplifiers. This depends on the optical gain material used. In semiconductor optical waveguide amplifiers, waveguides are formed out of semiconductor materials, including InP and InGaAs. In RE-doped waveguide amplifiers, the optical gain is provided by rare-earth ions, such as Erbium (Er), Ytterbium (Yb), or Thulium (Tm), embedded in host waveguides, typically made of a dielectric insulator. RE-doped waveguide amplifiers are advantageous for providing optical gains for signals consisting of multiple wavelengths or amplifying optical pulses having optical energies exceeding pJ.

Planar PIC RE-doped waveguide amplifiers are not as widely deployed in the field. By contrast, RE-doped fiber optical amplifiers are used in optical communication as the standard optical gain elements. Prior-art, planar RE-doped waveguide amplifiers include an all-glass geometry, whereby the substrate and cover include passive (i.e., undoped with RE) silica glass and the core includes glassy host materials doped with RE ions. Fabrication of such doped waveguide cores can be complex, leading to limited market penetration. In addition, the potential for reduction of the prior-art RE-doped PIC size in comparison to equivalent fiber devices is not significant owing to the small index contrast between the undoped and doped materials.

What is desired in the art is RE-doped waveguide structure that can support tighter waveguide bend radii. What is also desired is a more compact structure. It is also desired that such structure have small background optical loss so that optical gain can be obtained in power efficient manner.

What is also desired in the art is a RE-doped PIC waveguide amplifier that can be fabricated using a process that is more conducive to mass-scale production. Prior-art RE-doped waveguide processing is not CMOS process compatible.

SUMMARY

The foregoing needs are met, to a great extent, by the invention directed to a RE-doped planar waveguide amplifier.

An aspect of the present application is directed to a planar waveguide amplifier. The planar waveguide amplifier includes a substrate including an upper surface and a lower surface. The planar waveguide amplifier includes a core formed on the upper surface of the substrate. The core includes a channel configured to transmit light there through. The planar waveguide amplifier also includes an upper cladding layer formed above the core. The upper cladding layer includes a glass doped with rare earth material in an amount less than about 5% of the upper cladding layer.

Another aspect of the application is directed to a method of making a planar waveguide amplifier. The method includes a step of providing a substrate including an upper and lower surface. The method also includes a step of forming a core on the upper surface of the substrate. The core is free of rare-earth doped material. The method also includes a step of forming an upper cladding layer on the core. The upper cladding layer includes a glass doped with rare-earth material.

Yet another aspect of the application is directed to a method of amplifying a signal. The method includes a step of providing a waveguide amplifier including a substrate having upper and lower surfaces, a core disposed on the upper surface of the substrate, and an upper cladding layer disposed on the core and including a rare-earth doped material. The method also includes a step of receiving a signal light in a first end of the core. The method further includes a step of receiving a pump light in the core to excite a surface of the upper cladding layer including the rare-earth doped material. The method even further includes a step of guiding the signal and pump light through the core such that about 30-40% of a mode of the signal light and a mode of the pump light overlap in the upper cladding layer. Thereafter, the method includes a step of amplifying the signal light after the guiding step.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

FIG. 4 illustrates a method of amplifying a signal according to an aspect of the application.

DETAILED DESCRIPTION

Figure 1A:
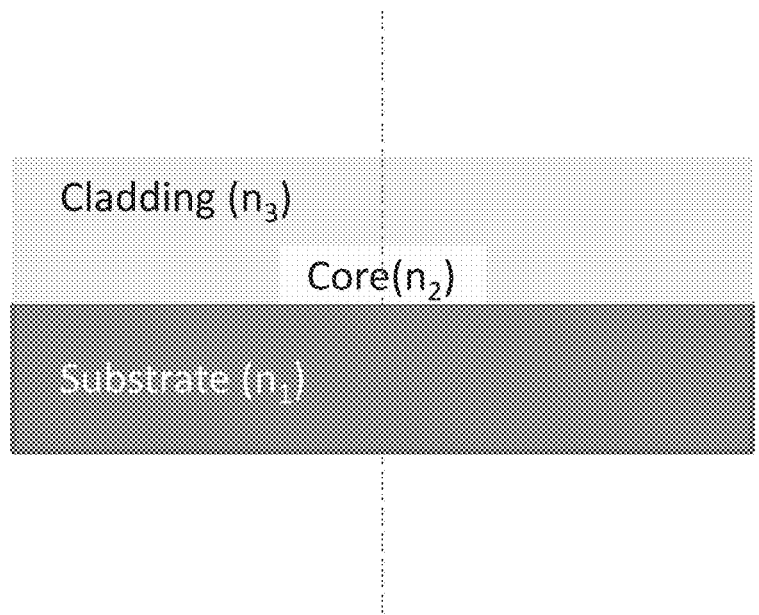
FIG. 1A illustrates a planar waveguide amplifier according to an aspect of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

Figure 1B:
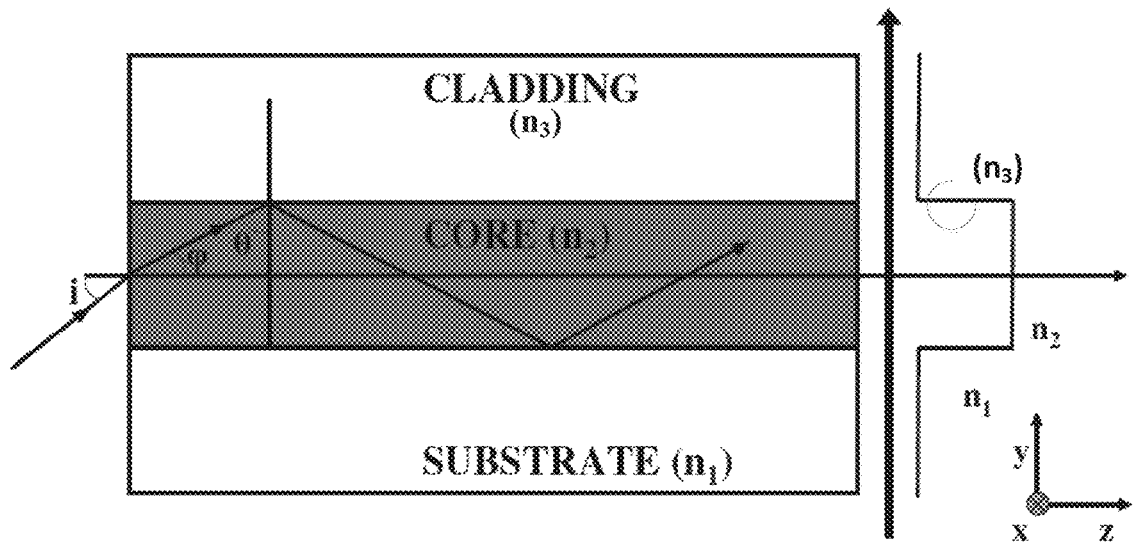
FIG. 1B illustrates the path of light in a planar waveguide amplifier according to FIG. 1A.

FIG. 1A illustrates a schematic of a planar waveguide device where the core is of rectangular channel type. The waveguide 100 includes a substrate or lower cladding layer 110, a core 120 and cover or upper cladding layer 130. The core 120 is surrounded by the substrate 110 and upper cladding 130. Here, the core has a higher refractive index ($n_2$) than the substrate ($n_1$) and the upper cladding ($n_3$). As shown in FIG. 1B, light propagation is confined vertically (y-direction) by total internal reflection because $n_2 > n_1$ and $n_2 > n_3$. Light propagation is similarly confined in the lateral direction (x direction)

In conventional RE-doped waveguide amplifiers, the cladding and substrate are typically undoped (i.e., without RE ions) glasses having similar refractive indices ($n_1 \neq n_2$). The core is another glass doped with RE ions and $n_2$ is slightly larger than $n_1$ and $n_3$ for optical guiding. However, the process for depositing and doping the core material is not compatible with CMOS silicon processing. Furthermore, the core waveguide is implemented with an etching process that is not compatible with CMOS silicon processing. Typically, the difference between the core and cladding indices is less than 1%.

The inventive RE-doped planar waveguide described in this application includes a core waveguide that is not doped with RE ions. The core waveguide can be deposited and processed by techniques that are wholly compatible with CMOS silicon foundry processing. Since the core waveguide does not need to be doped with RE ions, a wider class of materials including silicon (Si), silicon nitride (SiN), and silicon oxynitride (SiON) can be used for the core waveguide, enabling facile control of the optical refractive index. The optical gain is provided by deposition of RE-doped materials in the upper cladding. Since the upper cladding deposition is the final process, it can occur outside the CMOS fab without the risk of contaminating the higher class process line.

Figure 2A:
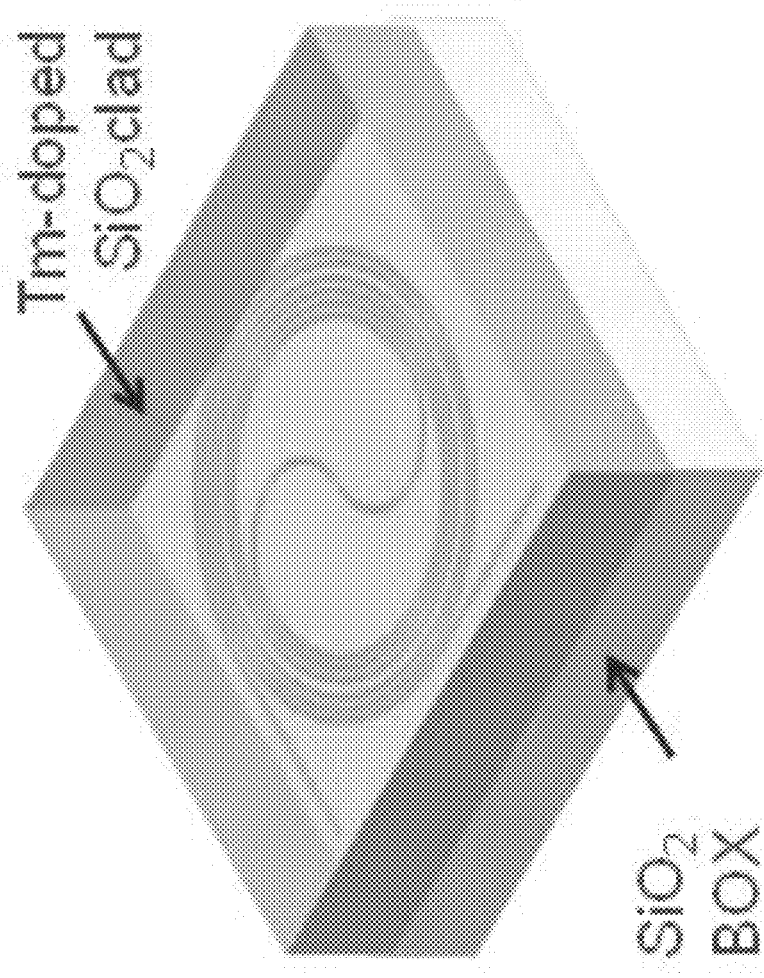
FIG. 2A illustrates an embodiment of the architecture according to an aspect of the application.

According to an embodiment, FIG. 2A illustrates a Tm-doped waveguide amplifier having a channel core waveguide similar to that shown in FIG. 1A. The substrate is a buried silicon dioxide (BOX) having ~3.5 μm thickness grown on a crystalline silicon wafer. The core waveguide includes a 0.2 μm (height)×2 μm (width) SiN channel waveguide. The upper clad is multi-component glass doped with Tm ions. The core waveguide guides both signal photons and pump photons that induce optical inversion in Tm-ions and hence optical gain for the signal photons.

In this embodiment, a thin (200 nm) layer of SiN is deposited on a BOX-on-silicon base wafer using CMOS compatible processes such as PECVD (plasma enhance chemical vapor deposition) or LPCVD (low pressure chemical vapor deposition). Channel waveguide is defined by using CMOS-compatible process such as RIE (reactive ion etching). As shown in FIG. 2A, the core 220 may be a circular spiraled structure to maximize the usage of area of the substrate or lower cladding layer 210. The circular spiraled structure also maximizes the bending radius of the waveguide 220. The waveguide may have a length on the order of a few centimeters. For example, the length may be about 10 cm. The inventive waveguide amplifier is prepared in a manner whereby a core of the waveguide is free of dopants, particularly RE dopants.

Once the SiN core waveguide is fabricated, the deposition of Tm-doped glass deposition can occur outside the CMOS fab, wherein Tm-doped glass can be deposited using PECVD. In one embodiment, the Tm-doped glass may be silicate glass containing other chemical elements such as P, Ge, Al, and B. The chemical composition of the constituents can be controlled to achieve a target optical refractive index. Tm-concentration may range from less than 1 wt. % to 5 wt. % depending on the application. In one embodiment, the refractive indices of the substrate, core, and upper cladding are 1.46, 2, 1.533, respectively at a 2 μm signal wavelength.

Figure 2B:
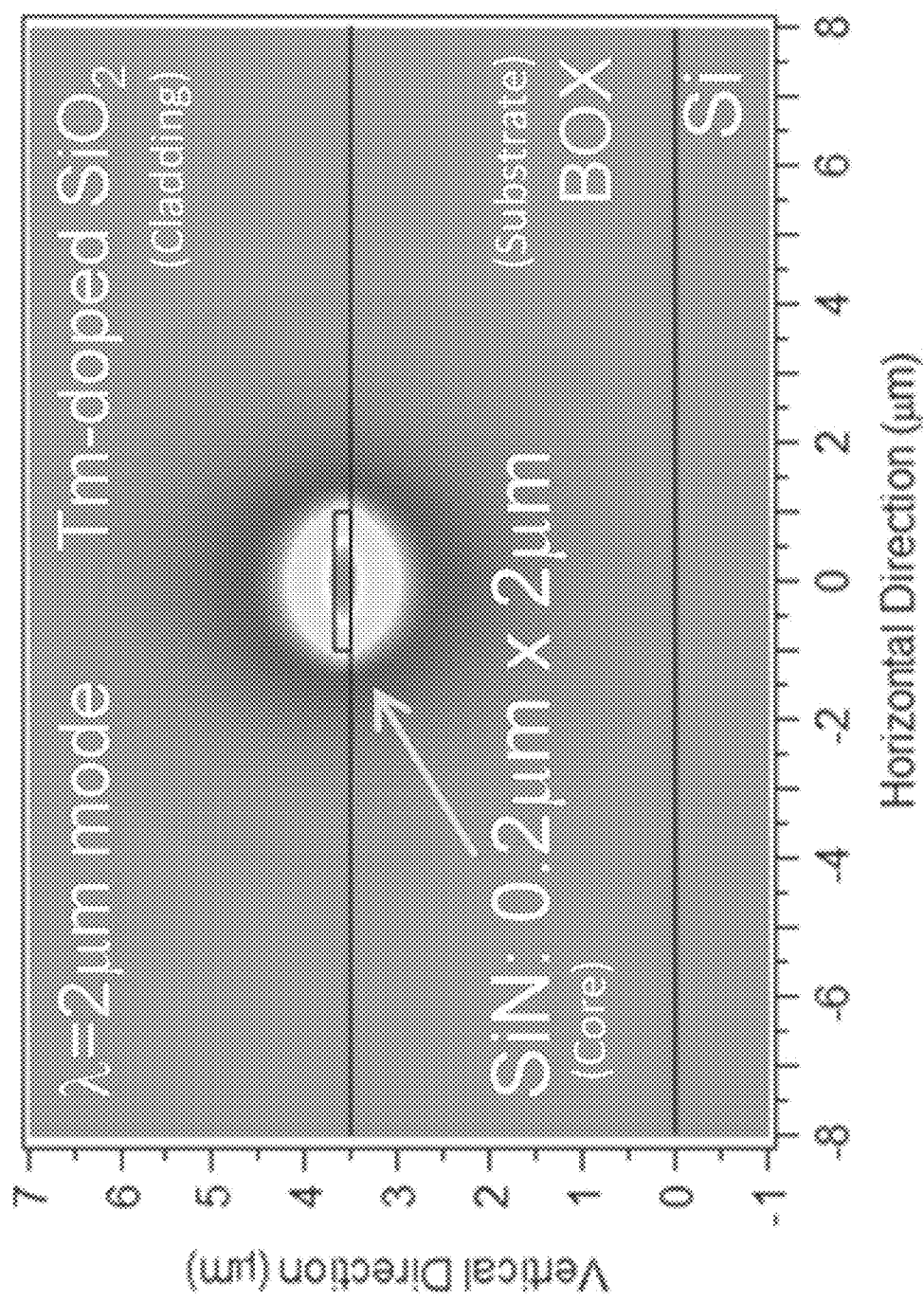
FIG. 2B illustrates an embodiment of the mode field according to an aspect of the application.

In one embodiment, the waveguide amplifier is targeted for amplifying an optical signal having 2-μm wavelength. Full vectorial calculation of the fundamental mode of the waveguide structure in FIG. 2A is shown in FIG. 2B. As it is shown, a substantial fraction of the signal energy, up to 38%, lies in the upper cladding doped with Tm. Tm-ions can be efficiently pumped using 1620-nm pump light and provide optical gain for the 2-μm as shown by the emission and absorption cross section of Tm in FIG. 3. Similar mode calculation shows that the 1620-nm pump light also has significant overlap with the Tm-doped cladding (>35%) The pump and signal modes are in good overlap with each other, allowing for efficient amplification.

In other embodiments, where the signal of interest has different wavelength than 2 μm, the RE dopant may include at least one of the following: praseodymium, neodymium, terbium, dysprosium, holmium, erbium, and, ytterbium. However, those skilled in the art will recognize that other elements, as well as combinations of elements, can be used.

Generally, RE-doped amplifiers have larger saturation energy than semiconductor amplifiers and as a result are better suited for amplifying high-energy short optical pulses. For example, Tm has a broad gain spectrum which spans 1.8 to 2.05 μm and is well-suited for amplifying 2-μm signal pulses having pulse duration shorter than 100 fs, which may have over ~40 nm optical bandwidth and energy exceeding 1 pJ. In other cases, Er has a broad gain ranging from 1530 nm to 1570 nm, with sufficient optical bandwidth for amplifying ~100 fs optical pulses.

An important source of loss in dielectric waveguides is scattering of the propagating waves at the surface of the waveguide or at its interfaces with the cladding layer and the substrate, caused by the roughness and irregularities at the interface. In the prior art, excess scattering loss can be caused by imperfection in the etching of the ER-doped multi-component core waveguide. Meanwhile, the present application describes a waveguide using a CMOS silicon process on Si or SiN that minimizes the waveguide wall roughness and other imperfections.

Another important source of waveguide propagation loss is radiation loss, wherein light that is confined and guided in a waveguide is coupled to radiation modes and starts propagating in the substrate or cladding region. It becomes especially problematic when the light is propagating in curved waveguides with a sharp bend. The bend loss that can be tolerated depends on the bend radius, which in turn depends on the index contrast between the core and the surrounding cladding materials. In the prior art, the index contrast is typically ~1% and the minimum tolerable bend radius is ~5 mm, limiting the miniaturization of such waveguide amplifier devices. In the present invention, the core index can be substantially higher than the cladding materials. In the embodiment shown in FIG. 2, the core index is 2 while the cladding indices are less than 1.533. This allows a bend radius less than 0.1 mm, enabling much denser integration.

In an embodiment shown in FIG. 2B, the waveguide is designed with an aspect ratio such that its mode has negligible overlap with the sidewall of the waveguide. The sidewall roughness of the waveguide is typically the main cause of scattering loss because the sidewall is defined by etching process, while the top and bottom surfaces are defined by epitaxial growth. The waveguide geometry (0.2 μm×2 μm) ensures that the optical signal is guided while the scattering loss, which is the dominant cause when the index contrast is large, is minimized.

According to the application, background loss, including the scattering loss, in the waveguide is less than about 20 dB/m. In another embodiment, the waveguide background loss may be less than about 10 dB/m. In yet another embodiment, the waveguide background loss may between about 10-20 dB/m.

Figure 3:
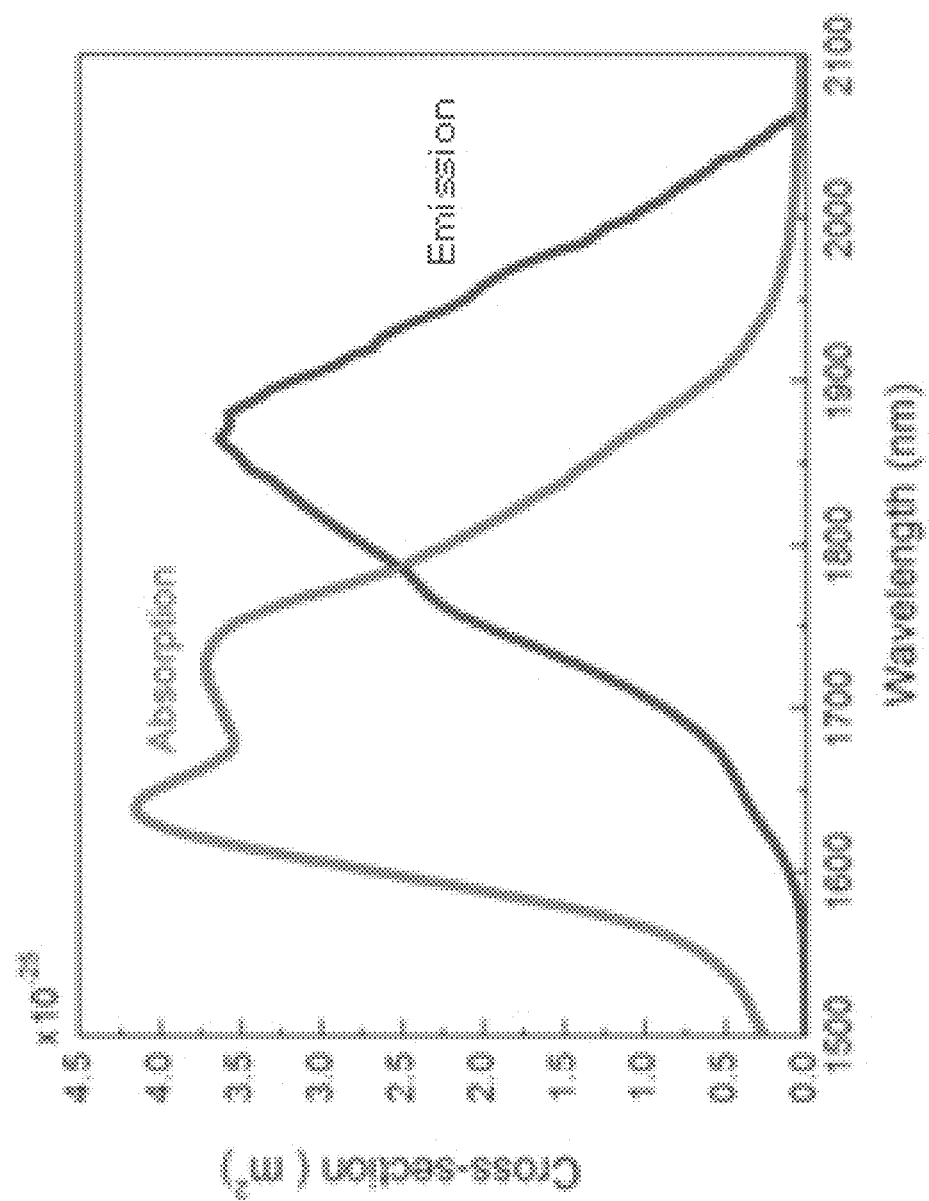
FIG. 3 illustrates absorption and emission spectra for the rare earth element of Thulium.

In an exemplary embodiment, four COTS Fabry-Perot pump lasers (~1620 nm) are polarization and wavelength multiplexed to provide 320 mW power to the RE gain section. The rare earth doped material is preferably Tm. As shown in FIG. 3, the 1620 nm pump wavelength maximizes pump absorption. Accordingly, amplifier efficiency is maximized for signal between 1800 and 2000 nm. When the background loss of the waveguide is less than 3 dB/m, 1 mW input signal can be amplified up to 200 mW over 10-cm SiN waveguide embedded in Tm-doped glass.

A method of amplifying light is described in another aspect of the application. As shown in the steps in FIG. 4, a waveguide amplifier according to one of the embodiments described above is employed (Step 410). An input light signal can be injected at a first free end of the core of the waveguide (Step 420). Preferably, the input light signal wavelength $\lambda_s$ overlaps with the emission band of the RE-doped material and the pump light wavelength $\lambda_p$ overlaps with the absorption band of the RE-doped material. In one embodiment, $\lambda_p$~1620 nm and $\lambda_s$~1900 nm when Tm is the RE ions. In another embodiment, $\lambda_p$~1480 nm and $\lambda_s$~1550 nm, when Er is the RE ions.

A pump laser including a pump light $\lambda_P$ can be aligned with the first free end of the core to direct the pump light into the waveguide core along with the input light signal $\lambda_s$ (Step 430). The pump light can excite the RE-doped upper cladding layer resulting in amplification of the input light signal $\lambda_s$ (Step 440). Namely, as the pump light $\lambda_p$ propagates within the upper cladding layer, the pump modes overlap spatially with the waveguide and the pump light $\lambda_p$ is absorbed by the rare earth ions. The pump light absorption causes rare earth ion excitation and signal amplification as understood by those skilled in the art. The difference in the refractive indices between the core and the cladding layers keeps generally all of the pump light from exiting the upper cladding layer as understood by those skilled in the art. The waveguide is designed to support single mode propagation of the pump light $\lambda_p$.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A waveguide amplifier comprising:
    a substrate including an upper surface and a lower surface;
    a core (Si or SiN) formed on an upper surface of the substrate, the core including a channel configured to transmit light there through; and
    an upper cladding layer formed above the core, the upper cladding layer including a glass doped with rare earth material in an amount less than about 5 wt. % of the upper cladding layer.

2. The waveguide amplifier of claim 1, wherein the core is free of rare-earth material.

3. The waveguide amplifier of claim 1, wherein the upper cladding layer is selected from rare-earth materials, silica, phosphorus, geranium, aluminum, boron or combinations thereof.

4. The waveguide amplifier of claim 1, wherein the rare earth material is present in an amount less than 3%.

5. The waveguide amplifier of claim 4, wherein the rare earth material is present in an amount less than 1%.

6. The waveguide amplifier of claim 1, wherein the rare-earth doped material is selected from lanthanum, cerium, praseodymium, neodymium, promethium, samarium, europium, gadolinium, terbium, dysprosium, holmium, erbium, thulium, ytterbium, lutetium or combinations thereof.

7. The waveguide amplifier of claim 1, wherein the core has a circular spiraling configuration entirely positioned on the upper surface of the substrate.

8. The waveguide amplifier of claim 1, wherein the upper cladding layer exhibits a waveguide loss less than 20 dB/m at wavelengths ranging from 1 to 8 μm.

9. The waveguide amplifier of claim 8, wherein the waveguide loss is less than 10 dB/m at a wavelength less than 2 μm.

10. The waveguide amplifier of claim 1, wherein the waveguide amplifier is about 100 nm thick, and a height of the core is about 10% of the width of the core in relation to a horizontal axis.

11. The waveguide amplifier of claim 10, having a bend radius less than 0.1 mm.

12. An apparatus compatible with a CMOS silicon process including the waveguide amplifier of claim 1.

13. A method of amplifying a signal comprising:
   providing a waveguide amplifier including
      a substrate having upper and lower surfaces,
      a core disposed on the upper surface of the substrate, and
      an upper cladding layer disposed on the core and including a rare-earth doped material;
   receiving a signal light in a first end of the core;
   receiving a pump light in the core to excite a surface of the upper cladding layer including the rare-earth doped material;
   guiding the signal and pump light through the core such that about 30-40% of a mode of the signal light and a mode of the pump light overlap in the upper cladding layer; and
   amplifying the signal light after the guiding step.

14. The method of claim 13, wherein about 35-40% of the mode of the signal light and the mode of the pump light overlap in the upper cladding layer.

15. The method of claim 13, wherein an output of the signal light is less than less than about 15.8 mW at 60 MW of the pump light.

16. The method of claim 15, wherein an output of the signal light is about 6-10 mW at 60 mW of the pump light.

17. The method of claim 11, wherein the core is free of dopants.

18. The method of claim 11, wherein the upper cladding layer is selected from the rare-earth materials, silica, phosphorus, geranium, aluminum, boron or combinations thereof.

19. The method of claim 11, wherein the upper cladding layer includes a glass doped with rare earth material in an amount less than about 5 wt. % of the upper cladding layer.

20. The method of claim 18, wherein the rare earth material is present in an amount less than 3%.

* * * * *